United States Patent

[11] 3,633,252

[72] Inventors Harrison L. Williams
Euclid;
Clarence E. Smrekar, Cleveland, both of Ohio
[21] Appl. No. 866,678
[22] Filed Oct. 15, 1969
[45] Patented Jan. 11, 1972
[73] Assignee Preformed Line Products Company
Cleveland, Ohio

[54] APPLIANCE FOR LINEAR BODIES
5 Claims, 4 Drawing Figs.
[52] U.S. Cl. .................................................. 24/123 C, 248/51
[51] Int. Cl. .................................................. F16g 11/00, B61s 21/00
[50] Field of Search ......................................... 24/123 T; 248/51; 174/79

[56] References Cited
UNITED STATES PATENTS
2,202,538  5/1940  Selquist ...................... 248/54 X
1,787,106  12/1930  Glazener ...................... 248/51
3,355,542  11/1967  Finn ............................ 24/123 C Primary Examiner—Paul R. Gilliam
Attorneys—Hume, Clement, Hume and Lee, Ltd., James P. Hume, Patricia H. Hume and Clement, Lee, Wetzel, Willian, Cook, Lione, Hofer, Cummins, Blanchard ABSTRACT: A dead end device for a cable of noncircular cross section, such as a figure eight or dumbbell-type cable, comprises a first elongated leg portion nominally straight over its full length and adapted to be positioned along a longitudinal recess of the cable. A second elongated leg portion is helically preformed and adapted to concomitantly be applied about the linear body and the straight leg portion in tightly encircling relation therewith to effect a secure frictional gripping of the cable by the combined gripping action of the straight leg portion and the helically preformed leg. A bight portion integral with both legs completes the structure of the appliance. Other features are disclosed.

PATENTED JAN 11 1972 3,633,252

Inventors.
Harrison L. Williams, &
Clarence F. Smrekar.
By Hume, Clement, Hume & Lee
Attys.

APPLIANCE FOR LINEAR BODIES

INTRODUCTION

The present invention relates generally to appliances for linear bodies and, more particularly, is directed to a new and improved dead end device particularly suited for use with cables of a noncircular cross section.

SUMMARY OF THE INVENTION

It is an objective of the present invention to provide a helically preformed dead end of a construction specifically suited for gripping cables or the like of noncircular cross section, such as messenger cables of the so-called figure eight and dumbbell types.

More particularly, the invention is directed to a helically preformed appliance comprising a first elongated leg portion nominally straight over its length and a second elongated leg portion helically preformed to a predetermined internal diameter and pitch length. A return bent intermediate portion integral with the first and second legs completes the structure of the appliance. The helically preformed leg is adapted to be concomitantly applied about a linear body and the straight leg portion in tightly encircling relation therewith to effect a secure frictional gripping of the linear body by the combined action of the straight leg portion and the helically preformed leg portion.

In accordance with a further facet of the invention, a tangential support for a cable or the like is provided by applying a pair of the appliances of the invention to the cable such that the legs of the respective devices extend in opposite directions and the bight portions are located in concentric alignment so as to form a single support loop.

BRIEF DESCRIPTION OF THE DRAWINGS

The novel features of the present invention are set forth with particularity in the appended claims. The invention together with further objects and advantages thereof may best be understood, however, by reference to the following description taken in conjunction with the accompanying drawings in the several figures of which like reference numerals identify like elements and in which:

DESCRIPTION OF THE PREFERRED EMBODIMENTS

Figure 1:
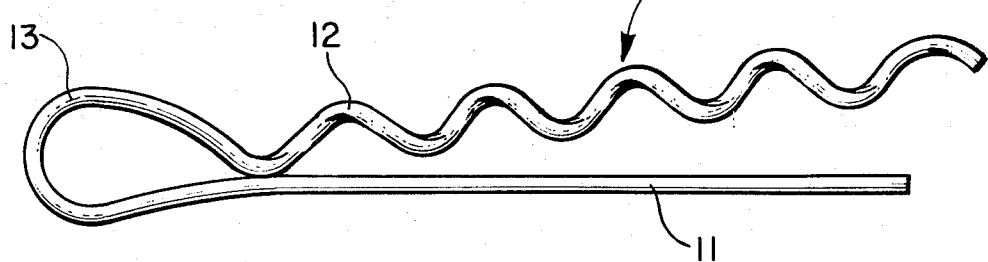
FIG. 1 illustrates a preferred embodiment of a helically preformed appliance embodying the teachings of the present invention.

Referring now to FIG. 1, the helically preformed appliance 10 there illustrated comprises a first elongated leg portion 11 which is nominally straight over its length. On the other hand, a second elongated leg portion 12 of the appliance is helically preformed to a predetermined internal diameter and pitch length. The structure of the appliance is completed by a bight portion 13 integrally formed with the legs 11 and 12.

As shown, the appliance 10 is composed of a single plastic rod fashioned in the described configuration although it will be recognized by those skilled in the art that the device may be fabricated from other materials such as wire. It will further be recognized by those skilled in the art that the various prior art teachings with respect to manufacture of helically preformed appliances including dead end appliances having two helically preformed leg portions may readily be applied to effect various modifications of the illustrated appliance 10 and, indeed, such is contemplated by the present invention. For example, a knurling or gritting of those surfaces of the appliance 10 that are adapted to engage a cable may be used to effectively enhance the gripping action of the device, as is disclosed and claimed in U.S. Pat. No. 3,183,658—Peterson assigned to the same assignee as the present invention. Additionally, by way of example, the appliance 10 may, in lieu of a single plastic rod, be comprised of an appropriate grouping of rods such as disclosed and claimed in U.S. Pat. No. 2,761,273—Peterson and assigned to the same assignee as the present invention.

Figure 2:
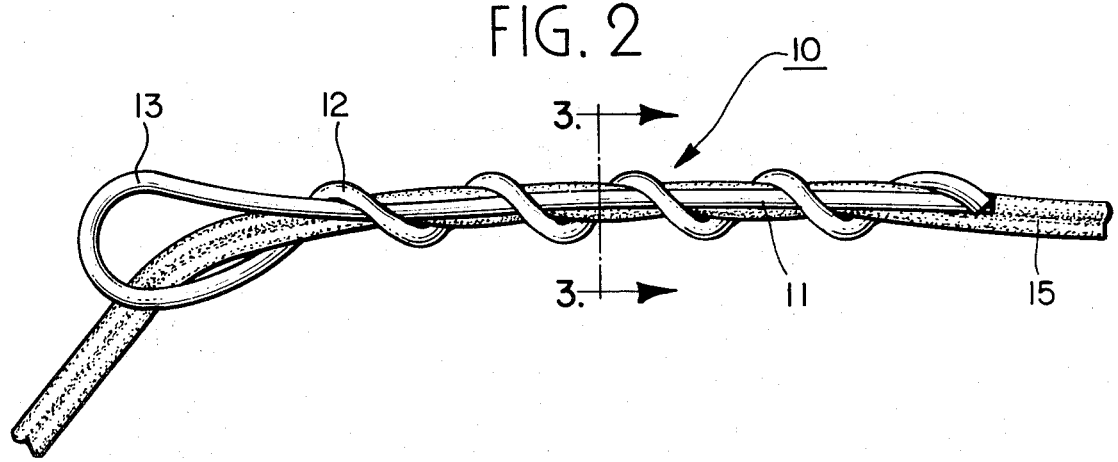
FIG. 2 illustrates the appliance of FIG. 1 as applied to a cable in providing a dead end support therefor.
Figure 3:
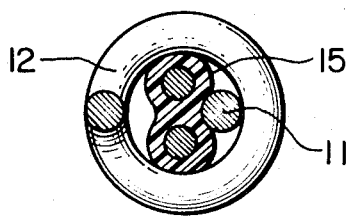
FIG. 3 is a cross-sectional view taken along lines 3—3 of FIG. 2.

Referring now to FIGS. 2 and 3, the appliance 10 is depicted in assembled relation with a linear body or cable 15. The illustrated cable 15 is a two-strand messenger cable of the so-called figure-eight type. In applying the appliance 10 to the cable 15, the nominally straight leg portion 11 is placed in intimate contact with the cable 15, preferably in the recess or depression formed intermediate the two conductors of the cable as shown most clearly in FIG. 3. In this regard, it is understood that the expression "nominally straight" as used in the present specification and appended claims is intended to denote that the leg 11 is of a nonhelical configuration.

With the leg 11 positioned in intimate contact with the cable 15, the helically preformed leg 12 is now applied about both the cable 15 and the leg 11 in tightly encircling relation therewith in the manner illustrated. It has been found that a secure frictional gripping of the cable 15 is obtained by the combined gripping action of the straight leg 11 and the helically preformed leg 12. Specifically, it has been found that the nominally straight leg 11 provides a rigid form about which the more flexible cable 15 may conform thereby providing a body of a relatively uniform and rigid contour for the helices to grip. Also, the gripping of the cable by the appliance 10 is further enhanced by the elongated area of frictional engagement between the straight leg 11 and the cable 15.

Figure 4:
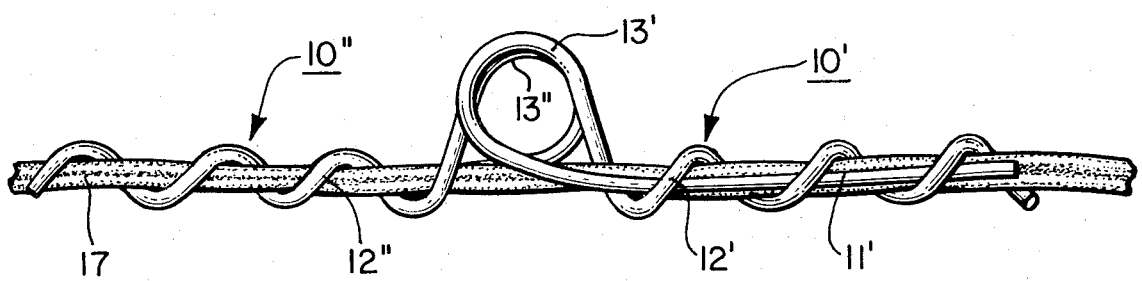
FIG. 4 illustrates a pair of the appliances of FIG. 1 as applied to a cable to provide a tangential support loop for the cable.

Referring now to FIG. 4, a pair of the appliances of the invention designated by the reference numerals 10' and 10" are shown applied about a cable 17 so as to form a tangential support loop therefor. The appliances 10', 10"10', are each identical to the appliance 10 previously described excepting that in forming the tangential support loop of FIG. 4, the appliances are applied to the cable 17 so that the respective bight portions 13', 13" extend vertically above the cable 17.

More particularly, in applying the appliances to the cable 17, the bight 13' of the device 10' is first located at a preselected support point along the cable 17 with the straight leg portion 11' lying in the recess formed intermediate the conductors of the cable. The helically preformed leg 12' is now wrapped in tightly encircling relation about both the cable and straight leg portion. The appliance 10" is applied to the cable 17 in like fashion to that of 10' excepting that its respective leg portions extend in a direction opposite from those of the appliance 10' and further the straight leg portion 11" (not visible in the drawing) is positioned on the opposite side of the cable 17 relative to that of the leg 11'. The bight portion 13" of the appliance 10" is positioned in concentric alignment with the bight 13' to form therewith the tangential support loop for the cable 17.

While a particular embodiment of the present invention has been shown and described, it is apparent that various changes and modifications may be made, and it is therefore intended in the following claims to cover all such modifications and changes as may fall within the true spirit and scope of this invention.

I claim:

1. A helically preformed appliance for gripping a linear body, comprising:
    a first elongated leg portion nominally straight over its length and having a first free end and a second opposite end;
    a second elongated leg portion helically preformed to a predetermined internal diameter and pitch length and having a first free end and a second opposite end;
    and a return bent intermediate portion having a pair of spaced ends integrally coupled to respective ones of said opposite ends of said first and second leg portions.

2. A helically preformed appliance of a generally U-shaped configuration for securely gripping a linear body of noncircular cross section, comprising:
- a first elongated leg portion nominally straight over its full length and adapted to be positioned in intimate relation with said linear body over a portion of the length thereof;
- a second elongated leg portion helically preformed to a predetermined diameter and pitch length adapting said leg portion to concomitantly be applied about said linear body and said straight leg portion in tightly encircling relation therewith to effect a secure frictional gripping of said linear body by the combined action of said straight leg portion and said helically preformed leg portion;
- and a return bent intermediate portion integral with said first and second leg portions.

3. An appliance for supporting a linear body at a predetermined point along its length comprising:
- a first helically preformed device comprising a first nominally straight leg portion adapted to be positioned in intimate engagement with said linear body over a portion of its length, a second leg portion helically preformed to a predetermined internal diameter and pitch length for application about both said linear body and first leg portion in tightly encircling engagement therewith to effect a secure frictional gripping of said linear body by the combined action of said straight leg portion and said helically preformed leg portion, and an intermediate bight portion integral with said first and second leg portions, said bight portion being located at said predetermined point on said linear body and said first and second leg portions extending in a first direction therefrom;
- and a second helically preformed device comprising a first nominally straight leg portion adapted to be positioned in intimate engagement with said linear body over a portion of its length, a second leg portion helically preformed to a predetermined internal diameter and pitch length for application about both said linear body and first leg portion in tightly encircling engagement therewith to effect a secure frictional gripping of said linear body by the combined action of said straight leg portion and said helically preformed leg portion, and an intermediate bight portion integral with said first and second leg portions, said bight portion being located at said predetermined point on said linear body in concentric alignment with the bight of said first helically preformed appliance to form therewith a support loop and said first and second leg portions of said second device extending along said linear body from said predetermined point in a direction opposite to that of the legs of said first device.

4. The combination of claim 3 wherein said linear body is of a noncircular cross section and said nominally straight leg portions of said first and second helically preformed appliances each cooperate with said linear body so as to enable a secure gripping of said linear body by said first and second helically preformed devices.

5. A dead end for securely gripping a linear body of noncircular cross section, comprising:
- an elongated, nominally straight member adapted to be positioned in intimate relation with said linear body over a portion of the length thereof;
- helically preformed means adapted to be concomitantly applied about said linear body and said elongated member in tightly encircling relation to effect a secure frictional gripping of said linear body by the combined action of said straight leg portion and said helically preformed leg portion;
- and a bight member coupled to said dead end means for providing a support loop for said dead end device.

* * * * *